(12) United States Patent
Whitney et al.

(10) Patent No.: US 8,473,179 B2
(45) Date of Patent: Jun. 25, 2013

(54) INCREASED FUEL ECONOMY MODE CONTROL SYSTEMS AND METHODS

(75) Inventors: Christopher E. Whitney, Commerce, MI (US); Andrew W. Baur, Flushing, MI (US); Alfred E. Spitza, Jr., Brighton, MI (US); Zhong Li, Novi, MI (US); Jeffrey M. Kaiser, Highland, MI (US)

(73) Assignee: GM Global Technology Operations LLC

( * ) Notice: Subject to any disclaimer, the term of this patent is extended or adjusted under 35 U.S.C. 154(b) by 524 days.

(21) Appl. No.: 12/845,164

(22) Filed: Jul. 28, 2010

(65) Prior Publication Data

US 2012/0029787 A1    Feb. 2, 2012

(51) Int. Cl.
*F02D 28/00* (2006.01)
*F02D 17/02* (2006.01)
*G06F 17/00* (2006.01)

(52) U.S. Cl.
USPC .................................................... 701/102

(58) Field of Classification Search
USPC .................. 701/102, 103, 104, 84; 123/198 F
See application file for complete search history.

(56) References Cited

U.S. PATENT DOCUMENTS

| | | | |
|---|---|---|---|
| 6,619,258 B2* | 9/2003 | McKay et al. | 123/198 F |
| 7,236,874 B2* | 6/2007 | Ichihara | 701/84 |
| 7,792,628 B2* | 9/2010 | Aswani et al. | 701/103 |
| 8,364,373 B2* | 1/2013 | Whitney et al. | 701/102 |

* cited by examiner

Primary Examiner — Hieu T Vo

(57) ABSTRACT

An engine control system includes a desired manifold absolute pressure (MAP) module, a MAP to torque module, a threshold determination module, and a fuel economy (FE) mode module. The desired MAP module determines a desired MAP for operation of an engine in one of a cylinder deactivation mode and a low-lift mode based on a difference between a desired vacuum and an air pressure upstream of a throttle valve. The MAP to torque module determines a desired torque output of the engine for operation in the one of the cylinder deactivation mode and the low-lift mode based on the desired MAP. The threshold determination module determines an entry torque based on the desired torque output. The FE mode module selectively triggers operation in the one of the cylinder deactivation mode and the low-lift mode based on a comparison of the entry torque and a torque request.

20 Claims, 8 Drawing Sheets

INCREASED FUEL ECONOMY MODE CONTROL SYSTEMS AND METHODS

FIELD

The present disclosure relates to internal combustion engines and more particularly to increased fuel efficiency mode control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

SUMMARY

An engine control system includes a desired manifold absolute pressure (MAP) module, a MAP to torque module, a threshold determination module, and a fuel economy (FE) mode module. The desired MAP module determines a desired MAP for operation of an engine in one of a cylinder deactivation mode and a low-lift mode based on a difference between a desired vacuum and an air pressure upstream of a throttle valve. The MAP to torque module determines a desired torque output of the engine for operation in the one of the cylinder deactivation mode and the low-lift mode based on the desired MAP. The threshold determination module determines an entry torque based on the desired torque output. The FE mode module selectively triggers operation in the one of the cylinder deactivation mode and the low-lift mode based on a comparison of the entry torque and a torque request.

An engine control method includes: determining a desired manifold absolute pressure (MAP) for operation of an engine in one of a cylinder deactivation mode and a low-lift mode based on a difference between a desired vacuum and an air pressure upstream of a throttle valve; determining a desired torque output of the engine for operation in the one of the cylinder deactivation mode and the low-lift mode based on the desired MAP; determining an entry torque based on the desired torque output; and selectively triggering operation in the one of the cylinder deactivation mode and the low-lift mode based on a comparison of the entry torque and a torque request.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
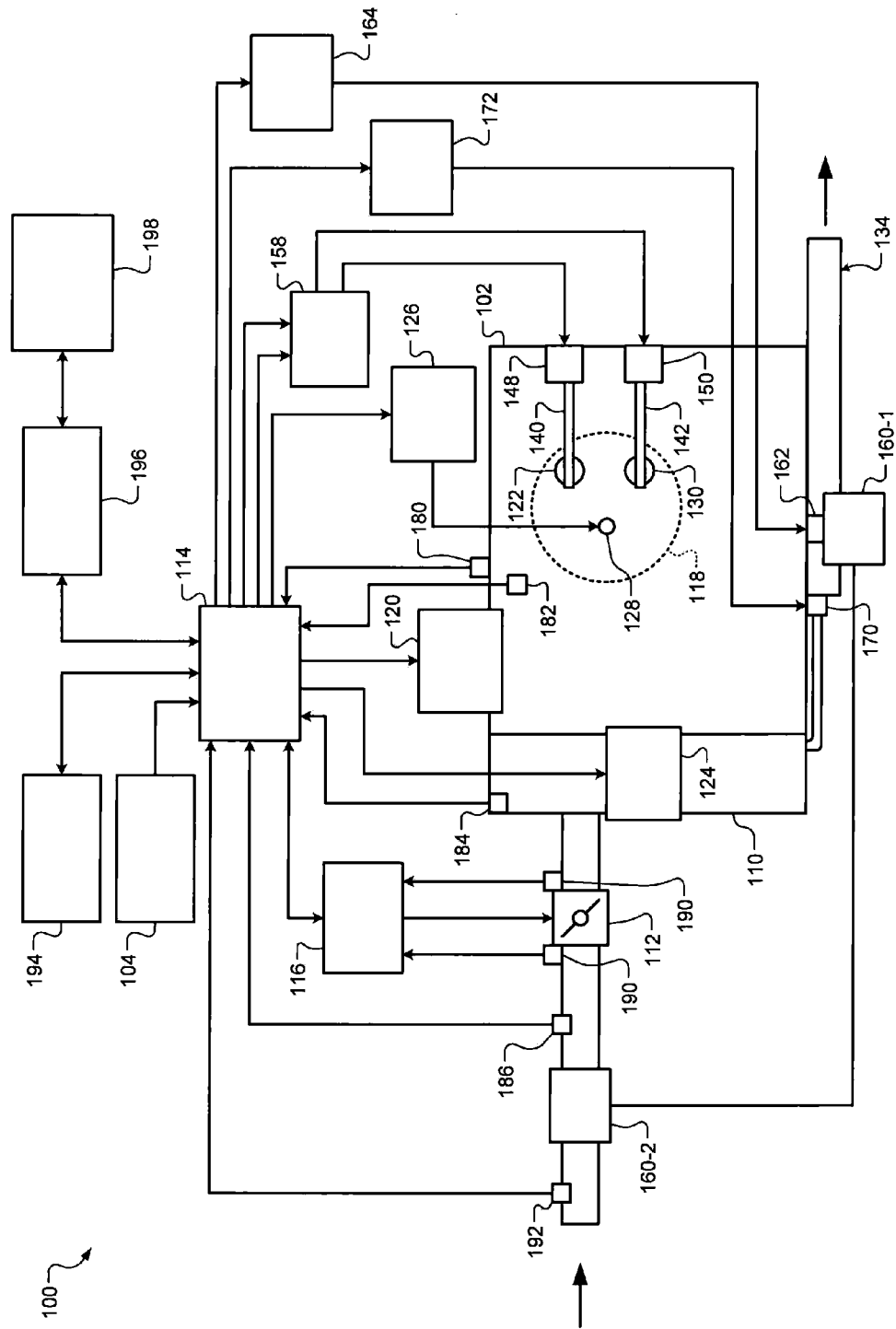
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

An engine control module (ECM) may selectively operate an engine in one or more increased fuel economy (FE) modes. For example only, the ECM may operate an engine in a cylinder deactivation mode and/or in a low-lift mode. The ECM may deactivate one or more cylinders during operation in the cylinder deactivation mode. During operation in the low-lift mode, a camshaft may open an associated valve of a cylinder to a lesser extent and/or for a lesser period than during operation in another lift mode (e.g., a high-lift mode). Generally, the maximum torque that the engine can produce during operation in an FE mode is limited, but FE is increased.

The ECM of the present disclosure determines whether to operate in an increased FE mode based on a maximum engine output torque that can be achieved during operation in the increased FE mode. More specifically, the ECM determines entry and exit thresholds for entering and exiting operation in the increased FE mode, respectively, based on the maximum engine output torque. The ECM selectively triggers entry into and exit out of operation in the increased FE mode when a torque request is less than the entry threshold and greater than the exit threshold, respectively.

Referring now to FIG. 1, a functional block diagram of an exemplary engine system 100 is presented. The engine system 100 includes an engine 102 that combusts an air/fuel mixture to produce drive torque for a vehicle based on driver input from a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing is changed between a last firing event and the next firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting an angle of the blade of the throttle valve 112.

Similarly, the spark actuator module 126 may be referred to as an actuator, while the corresponding actuator value may be the amount of spark advance relative to cylinder TDC. Other actuators may include the cylinder actuator module 120, the fuel actuator module 124, the phaser actuator module 158, the boost actuator module 164, and the EGR actuator module 172. For these actuators, the actuator values may correspond to number of activated cylinders, fueling rate, intake and exhaust cam phaser angles, boost pressure, and EGR valve opening area, respectively. The ECM 114 may control actuator values in order to cause the engine 102 to generate a desired engine output torque.

Figure 2:
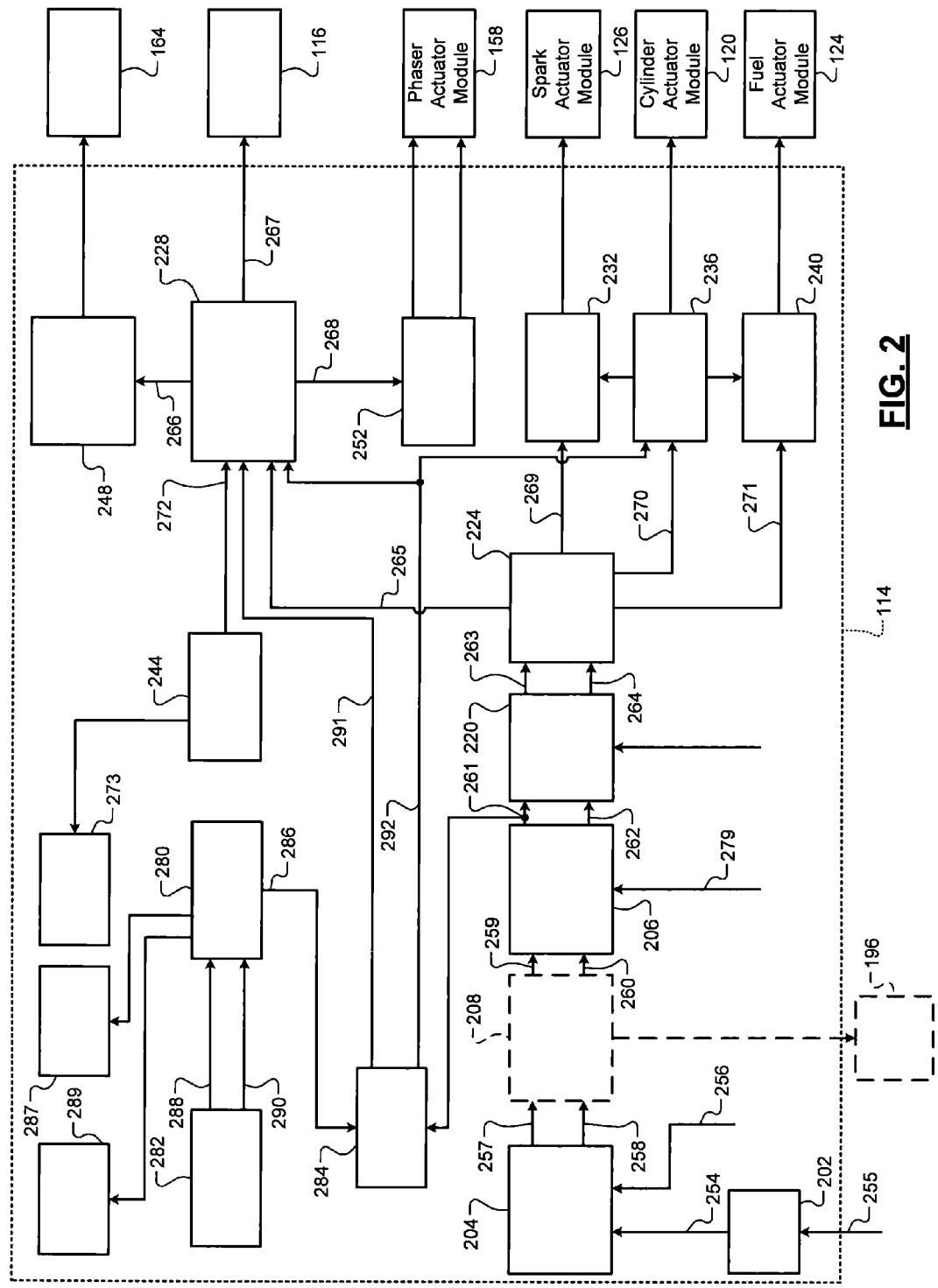
FIG. 2 is a functional block diagram of an exemplary engine control system according to the principles of the present disclosure.

Referring now to FIG. 2, a functional block diagram of an exemplary engine control system is presented. An exemplary implementation of the ECM 114 includes a driver torque module 202, an axle torque arbitration module 204, and a propulsion torque arbitration module 206. The ECM 114 may include a hybrid optimization module 208. The exemplary implementation of the ECM 114 also includes a reserves/loads module 220, an actuation module 224, an air control module 228, a spark control module 232, a cylinder control module 236, and a fuel control module 240. The exemplary implementation of the ECM 114 also includes a torque estimation module 244, a boost scheduling module 248, and a phaser scheduling module 252.

The driver torque module 202 may determine a driver torque request 254 based on a driver input 255 from the driver input module 104. The driver input 255 may be based on, for example, a position of an accelerator pedal and a position of a brake pedal. The driver input 255 may also be based on cruise control, which may be an adaptive cruise control system that varies vehicle speed to maintain a predetermined following distance. The driver torque module 202 may store one or more mappings of accelerator pedal position to desired torque and may determine the driver torque request 254 based on a selected one of the mappings.

An axle torque arbitration module 204 arbitrates between the driver torque request 254 and other axle torque requests 256. Axle torque (torque at the wheels) may be produced by various sources including an engine and/or an electric motor. Generally, torque requests may include absolute torque requests as well as relative torque requests and ramp requests. For example only, ramp requests may include a request to ramp torque down to a minimum engine off torque or to ramp torque up from the minimum engine off torque. Relative torque requests may include temporary or persistent torque reductions or increases.

The axle torque requests 256 may include a torque reduction requested by a traction control system when positive wheel slip is detected. Positive wheel slip occurs when axle torque overcomes friction between the wheels and the road surface, and the wheels begin to slip against the road surface. The axle torque requests 256 may also include a torque increase request to counteract negative wheel slip, where a tire of the vehicle slips in the other direction with respect to the road surface because the axle torque is negative.

The axle torque requests 256 may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. The axle torque requests 256 may also be generated by vehicle stability control systems.

The axle torque arbitration module 204 outputs a predicted torque request 257 and an immediate torque request 258 based on the results of arbitrating between the received torque requests 254 and 256. As described below, the predicted and immediate torque requests 257 and 258 from the axle torque arbitration module 204 may selectively be adjusted by other modules of the ECM 114 before being used to control actuators of the engine system 100.

In general terms, the immediate torque request 258 is the amount of currently desired axle torque, while the predicted torque request 257 is the amount of axle torque that may be needed on short notice. The ECM 114 controls the engine system 100 to produce an axle torque equal to the immediate torque request 258. However, different combinations of actuator values may result in the same axle torque. The ECM 114 may therefore adjust the actuator values to allow a faster transition to the predicted torque request 257, while still maintaining the axle torque at the immediate torque request 258.

In various implementations, the predicted torque request 257 may be based on the driver torque request 254. The immediate torque request 258 may be less than the predicted torque request 257, such as when the driver torque request 254 is causing wheel slip on an icy surface. In such a case, a traction control system (not shown) may request a reduction via the immediate torque request 258, and the ECM 114 reduces the torque produced by the engine system 100 to the immediate torque request 258. However, the ECM 114 controls the engine system 100 so that the engine system 100 can quickly resume producing the predicted torque request 257 once the wheel slip stops.

In general terms, the difference between the immediate torque request 258 and the (generally higher) predicted torque request 257 can be referred to as a torque reserve. The torque reserve may represent the amount of additional torque (above the immediate torque request 258) that the engine system 100 can begin to produce with minimal delay. Fast engine actuators are used to increase or decrease current axle torque. As described in more detail below, fast engine actuators are defined in contrast with slow engine actuators.

In various implementations, fast engine actuators are capable of varying axle torque within a range, where the range is established by the slow engine actuators. In such implementations, the upper limit of the range is the predicted torque request 257, while the lower limit of the range is limited by the torque capacity of the fast actuators. For example only, fast actuators may only be able to reduce axle torque by a first amount, where the first amount is a measure of the torque capacity of the fast actuators. The first amount may vary based on engine operating conditions set by the slow engine actuators. When the immediate torque request 258 is within the range, fast engine actuators can be set to cause the axle torque to be equal to the immediate torque request 258. When the ECM 114 requests the predicted torque request 257 to be output, the fast engine actuators can be controlled to vary the axle torque to the top of the range, which is the predicted torque request 257.

In general terms, fast engine actuators can more quickly change the axle torque when compared to slow engine actuators. Slow actuators may respond more slowly to changes in their respective actuator values than fast actuators do. For example, a slow actuator may include mechanical components that require time to move from one position to another in response to a change in actuator value. A slow actuator may also be characterized by the amount of time it takes for the axle torque to begin to change once the slow actuator begins to implement the changed actuator value. Generally, this amount of time will be longer for slow actuators than for fast actuators. In addition, even after beginning to change, the axle torque may take longer to fully respond to a change in a slow actuator.

For example only, the ECM 114 may set actuator values for slow actuators to values that would enable the engine system 100 to produce the predicted torque request 257 if the fast actuators were set to appropriate values. Meanwhile, the ECM 114 may set actuator values for fast actuators to values that, given the slow actuator values, cause the engine system 100 to produce the immediate torque request 258 instead of the predicted torque request 257.

The fast actuator values therefore cause the engine system 100 to produce the immediate torque request 258. When the ECM 114 decides to transition the axle torque from the immediate torque request 258 to the predicted torque request 257, the ECM 114 changes the actuator values for one or more fast actuators to values that correspond to the predicted torque request 257. Because the slow actuator values have already been set based on the predicted torque request 257, the engine system 100 is able to produce the predicted torque request 257 after only the delay imposed by the fast actuators. In other words, the longer delay that would otherwise result from changing axle torque using slow actuators is avoided.

For example only, when the predicted torque request 257 is equal to the driver torque request 254, a torque reserve may be created when the immediate torque request 258 is less than the driver torque request 254 due to a temporary torque reduction request. Alternatively, a torque reserve may be created by increasing the predicted torque request 257 above the driver torque request 254 while maintaining the immediate torque request 258 at the driver torque request 254. The resulting torque reserve can absorb sudden increases in required axle torque. For example only, sudden loads imposed by an air conditioner or a power steering pump may be counteracted by increasing the immediate torque request 258. If the increase in the immediate torque request 258 is less than the torque reserve, the increase can be quickly produced by using fast actuators. The predicted torque request 257 may also be increased to re-establish the previous torque reserve.

Another example use of a torque reserve is to reduce fluctuations in slow actuator values. Because of their relatively slow speed, varying slow actuator values may produce control instability. In addition, slow actuators may include mechanical parts, which may draw more power and/or wear more quickly when moved frequently. Creating a sufficient torque reserve allows changes in desired torque to be made by varying fast actuators via the immediate torque request 258 while maintaining the values of the slow actuators. For example, to maintain a given idle speed, the immediate torque request 258 may vary within a range. If the predicted torque request 257 is set to a level above this range, variations in the immediate torque request 258 that maintain the idle speed can be made using fast actuators without the need to adjust slow actuators.

For example only, in a spark-ignition engine, spark timing may be a fast actuator value, while throttle opening area may be a slow actuator value. Spark-ignition engines may combust fuels including, for example, gasoline and ethanol, by applying a spark. By contrast, in a compression-ignition engine, fuel flow may be a fast actuator value, while throttle opening area may be used as an actuator value for engine characteristics other than torque. Compression-ignition engines may combust fuels including, for example, diesel, by compressing the fuels.

When the engine 102 is a spark-ignition engine, the spark actuator module 126 may be a fast actuator and the throttle actuator module 116 may be a slow actuator. After receiving a new actuator value, the spark actuator module 126 may be able to change spark timing for the following firing event. When the spark timing (also called spark advance) for a firing event is set to a optimum value, a maximum amount of torque may be produced in the combustion stroke immediately following the firing event. However, a spark advance deviating from the optimum value may reduce the amount of torque produced in the combustion stroke. Therefore, the spark actuator module 126 may be able to vary engine output torque as soon as the next firing event occurs by varying spark advance. For example only, a table of spark advances corresponding to different engine operating conditions may be determined during a calibration phase of vehicle design, and the optimum value is selected from the table based on current engine operating conditions.

By contrast, changes in throttle opening area take longer to affect engine output torque. The throttle actuator module 116 changes the throttle opening area by adjusting the angle of the blade of the throttle valve 112. Therefore, once a new actuator value is received, there is a mechanical delay as the throttle valve 112 moves from its previous position to a new position based on the new actuator value. In addition, air flow changes based on the throttle opening area are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening area to a value that would allow the engine 102 to produce the predicted torque request 257. Meanwhile, the spark timing can be set based on the immediate torque request 258, which is less than the predicted torque request 257. Although the throttle opening area generates enough air flow for the engine 102 to produce the predicted torque request 257, the spark timing is retarded (which reduces torque) based on the immediate torque request 258. The engine output torque will therefore be equal to the immediate torque request 258.

When additional torque is needed, the spark timing can be set based on the predicted torque request 257 or a torque between the predicted and immediate torque requests 257 and 258. By the following firing event, the spark actuator module 126 may return the spark advance to an optimum value, which allows the engine 102 to produce the full engine output torque achievable with the air flow already present. The engine output torque may therefore be quickly increased to the predicted torque request 257 without experiencing delays from changing the throttle opening area.

When the engine 102 is a compression-ignition engine, the fuel actuator module 124 may be a fast actuator and the throttle actuator module 116 and the boost actuator module 164 may be emissions actuators. The fuel mass may be set based on the immediate torque request 258, and the throttle opening area, boost, and EGR opening may be set based on the predicted torque request 257. The throttle opening area may generate more air flow than necessary to satisfy the predicted torque request 257. In turn, the air flow generated may be more than required for complete combustion of the injected fuel such that the air/fuel ratio is usually lean and changes in air flow do not affect the engine output torque. The engine output torque will therefore be equal to the immediate torque request 258 and may be increased or decreased by adjusting the fuel flow.

The throttle actuator module 116, the boost actuator module 164, and the EGR valve 170 may be controlled based on the predicted torque request 257 to control emissions and to minimize turbo lag. The throttle actuator module 116 may create a vacuum within the intake manifold 110 to draw exhaust gases through the EGR valve 170 and into the intake manifold 110.

The axle torque arbitration module 204 may output the predicted torque request 257 and the immediate torque request 258 to a propulsion torque arbitration module 206. In various implementations, the axle torque arbitration module 204 may output the predicted and immediate torque requests 257 and 258 to the hybrid optimization module 208.

The hybrid optimization module 208 may determine how much torque should be produced by the engine 102 and how much torque should be produced by the electric motor 198. The hybrid optimization module 208 then outputs modified predicted and immediate torque requests 259 and 260, respectively, to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests 279, including the converted predicted and immediate torque requests. The propulsion torque arbitration module 206 generates an arbitrated predicted torque request 261 and an arbitrated immediate torque request 262. The arbitrated torque requests 261 and 262 may be generated by selecting a winning request from among received torque requests. Alternatively or additionally, the arbitrated torque requests may be generated by modifying one of the received requests based on another one or more of the received torque requests.

The propulsion torque requests 279 may include torque reductions for engine over-speed protection, torque increases for stall prevention, and torque reductions requested by the transmission control module 194 to accommodate gear shifts. The propulsion torque requests 279 may also result from clutch fuel cutoff, which reduces the engine output torque when the driver depresses the clutch pedal in a manual transmission vehicle to prevent a flare (rapid rise) in engine speed.

The propulsion torque requests 279 may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated predicted and immediate torque requests 261 and 262.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

The reserves/loads module 220 receives the arbitrated predicted and immediate torque requests 261 and 262. The reserves/loads module 220 may adjust the arbitrated predicted and immediate torque requests 261 and 262 to create a torque reserve and/or to compensate for one or more loads. The reserves/loads module 220 then outputs adjusted predicted and immediate torque requests 263 and 264 to the actuation module 224.

For example only, a catalyst light-off process or a cold start emissions reduction process may require retarded spark advance. The reserves/loads module 220 may therefore increase the adjusted predicted torque request 263 above the adjusted immediate torque request 264 to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (A/C) compressor clutch. The reserve for engagement of the A/C compressor clutch may be created when the driver first requests air conditioning. The reserves/loads module 220 may increase the adjusted predicted torque request 263 while leaving the adjusted immediate torque request 264 unchanged to produce the torque reserve. Then, when the NC compressor clutch engages, the reserves/loads module 220 may increase the adjusted immediate torque request 264 by the estimated load of the A/C compressor clutch.

The actuation module 224 receives the adjusted predicted and immediate torque requests 263 and 264. The actuation module 224 determines how the adjusted predicted and immediate torque requests 263 and 264 will be achieved. The actuation module 224 may be engine type specific. For example, the actuation module 224 may be implemented differently or use different control schemes for spark-ignition engines versus compression-ignition engines.

In various implementations, the actuation module 224 may define a boundary between modules that are common across all engine types and modules that are engine type specific. For example, engine types may include spark-ignition and compression-ignition. Modules prior to the actuation module 224, such as the propulsion torque arbitration module 206, may be common across engine types, while the actuation module 224 and subsequent modules may be engine type specific.

For example, in a spark-ignition engine, the actuation module 224 may vary the opening of the throttle valve 112 as a slow actuator that allows for a wide range of torque control. The actuation module 224 may disable cylinders using the cylinder actuator module 120, which also provides for a wide range of torque control, but may also be slow and may involve drivability and emissions concerns. The actuation module 224 may use spark timing as a fast actuator. However, spark timing may not provide as much range of torque control. In addition, the amount of torque control possible with changes in spark timing (referred to as spark reserve capacity) may vary as air flow changes.

In various implementations, the actuation module 224 may generate an air torque request 265 based on the adjusted predicted torque request 263. The air torque request 265 may be equal to the adjusted predicted torque request 263, setting air flow so that the adjusted predicted torque request 263 can be achieved by changes to other actuators.

The air control module 228 may determine desired actuator values based on the air torque request 265. For example only, the air control module 228 may determine a desired manifold absolute pressure (MAP) 266, a desired throttle area 267, and/or a desired air per cylinder (APC) 268 based on the air torque request 265. The desired MAP 266 may be used to determine a desired boost, and the desired APC 268 may be used to determine desired cam phaser positions and the desired throttle area 267. In various implementations, the air control module 228 may also determine an amount of opening of the EGR valve 170 based on the air torque request 265.

The actuation module 224 may also generate a spark torque request 269, a cylinder shut-off torque request 270, and a fuel torque request 271. The spark torque request 269 may be used by the spark control module 232 to determine how much to retard the spark timing (which reduces engine output torque) from an optimum spark timing.

The cylinder shut-off torque request 270 may be used by the cylinder control module 236 to determine how many cylinders to deactivate when operation in a fuel economy (FE) mode is requested. The FE mode may include, for example only, an active fuel management (AFM) mode or a displacement on demand (DOD).

The cylinder control module 236 may instruct the cylinder actuator module 120 to deactivate one or more cylinders of the engine 102 when the AFM mode is commanded. The cylinder actuator module 120 may include a hydraulic system that selectively decouples intake and/or exhaust valves from the corresponding camshafts for one or more cylinders in order to deactivate those cylinders. For example only, the cylinder actuator module 120 may deactivate a predefined group of cylinders (e.g., half) jointly when the AFM mode is commanded. The cylinder control module 236 may also instruct the fuel control module 240 to stop providing fuel for deactivated cylinders and may instruct the spark control module 232 to stop providing spark for deactivated cylinders when the AFM mode is commanded. The spark control module 232 may stops providing spark for a cylinder once an fuel/air mixture that is already present in the cylinder has been combusted.

Some vehicles may additionally or alternatively be capable of operating the engine 102 in a fuel cutoff (FCO) mode. For example only, operation in the FCO mode may be commanded during vehicle deceleration. Operation in the FCO mode commanded pursuant to vehicle deceleration may be referred to as deceleration fuel cutoff (DFCO). In contrast with the AFM mode, one or more cylinders may be deactivated by halting provision of fuel to those cylinders when the FCO mode is commanded, without stopping the opening and closing of the intake and exhaust valves.

The fuel control module 240 may vary the amount of fuel provided to each cylinder based on the fuel torque request 271. During normal operation of a spark-ignition engine, the fuel control module 240 may operate in an air lead mode in which the fuel control module 240 attempts to maintain a stoichiometric air/fuel ratio by controlling fueling based on air flow. The fuel control module 240 may determine a fuel mass that will yield stoichiometric combustion when combined with the current amount of air per cylinder. The fuel control module 240 may instruct the fuel actuator module 124 via a fueling rate to inject this fuel mass for each activated cylinder.

In compression-ignition systems, the fuel control module 240 may operate in a fuel lead mode in which the fuel control module 240 determines a fuel mass for each cylinder that satisfies the fuel torque request 271 while minimizing emissions, noise, and fuel consumption. In the fuel lead mode, air flow is controlled based on fuel flow and may be controlled to yield a lean air/fuel ratio. In addition, the air/fuel ratio may be maintained above a predetermined level, which may prevent black smoke production in dynamic engine operating conditions.

The torque estimation module 244 may determine an achieved torque output of the engine 102. The achieved torque output of the engine 102 under the current operating conditions may be called an achieved air torque 272. The achieved air torque 272 may be used by the air control module 228 to perform closed-loop control of one or more engine air flow parameters, such as throttle area, MAP, and phaser positions. For example, an APC to torque relationship 273 such as $$T = f(APC, S, I, E, AF, OT, \#) \tag{1}$$

may be defined, where torque (T) is the achieved air torque 272 and is a function of air per cylinder (APC), spark timing (S), intake cam phaser position (I), exhaust cam phaser position (E), air/fuel ratio (AF), oil temperature (OT), and number of activated cylinders (#). Additional variables may also be accounted for, such as the degree of opening of an exhaust gas recirculation (EGR) valve. The APC to torque relationship 273 may be modeled by an equation and/or may be stored as a lookup table. The intake and exhaust cam phaser positions used may be based on actual positions, as the phasers may be traveling toward desired positions. The actual spark advance may be used to determine the achieved air torque 272.

The air control module 228 may output the desired throttle area 267 to the throttle actuator module 116. The throttle actuator module 116 then regulates the throttle valve 112 to produce the desired throttle area 267. The air control module 228 may determine the desired throttle area 267 based on the air torque request 265 as discussed further below (e.g., see FIG. 5).

The air control module 228 may output the desired MAP 266 to the boost scheduling module 248. The boost scheduling module 248 uses the desired MAP 266 to control the boost actuator module 164. The boost actuator module 164 then controls one or more turbochargers (e.g., the turbocharger including the turbine 160-1 and the compressor 160-2) and/or superchargers.

The air control module 228 outputs the desired APC 268 to the phaser scheduling module 252. Based on the desired APC 268 and the RPM signal, the phaser scheduling module 252 may control positions of the intake and/or exhaust cam phasers 148 and 150 using the phaser actuator module 158.

Referring back to the spark control module 232, the optimum spark timing may vary based on various engine operating conditions. For example only, a torque relationship may be inverted to solve for desired spark advance. For a given torque request ($T_{des}$), the desired spark advance ($S_{des}$) may be determined based on $$S_{des} = T^{-1}(T_{des}, APC, I, E, AF, OT, \#). \tag{2}$$

This relationship may be embodied as an equation and/or as a lookup table. The air/fuel ratio (AF) may be the actual air/fuel ratio, as reported by the fuel control module 240.

When the spark advance is set to the optimum spark timing, the resulting torque may be as close to a maximum best torque (MBT) as possible. MBT refers to the maximum engine output torque that is generated for a given air flow as spark advance is increased, while using fuel having an octane rating greater than a predetermined octane rating and using stoichiometric fueling. The spark advance at which this maximum torque occurs is referred to as an MBT spark timing. The optimum spark timing may differ slightly from MBT spark timing because of, for example, fuel quality (such as when lower octane fuel is used) and environmental factors. The engine output torque at the optimum spark timing may therefore be less than MBT.

Figure 3:
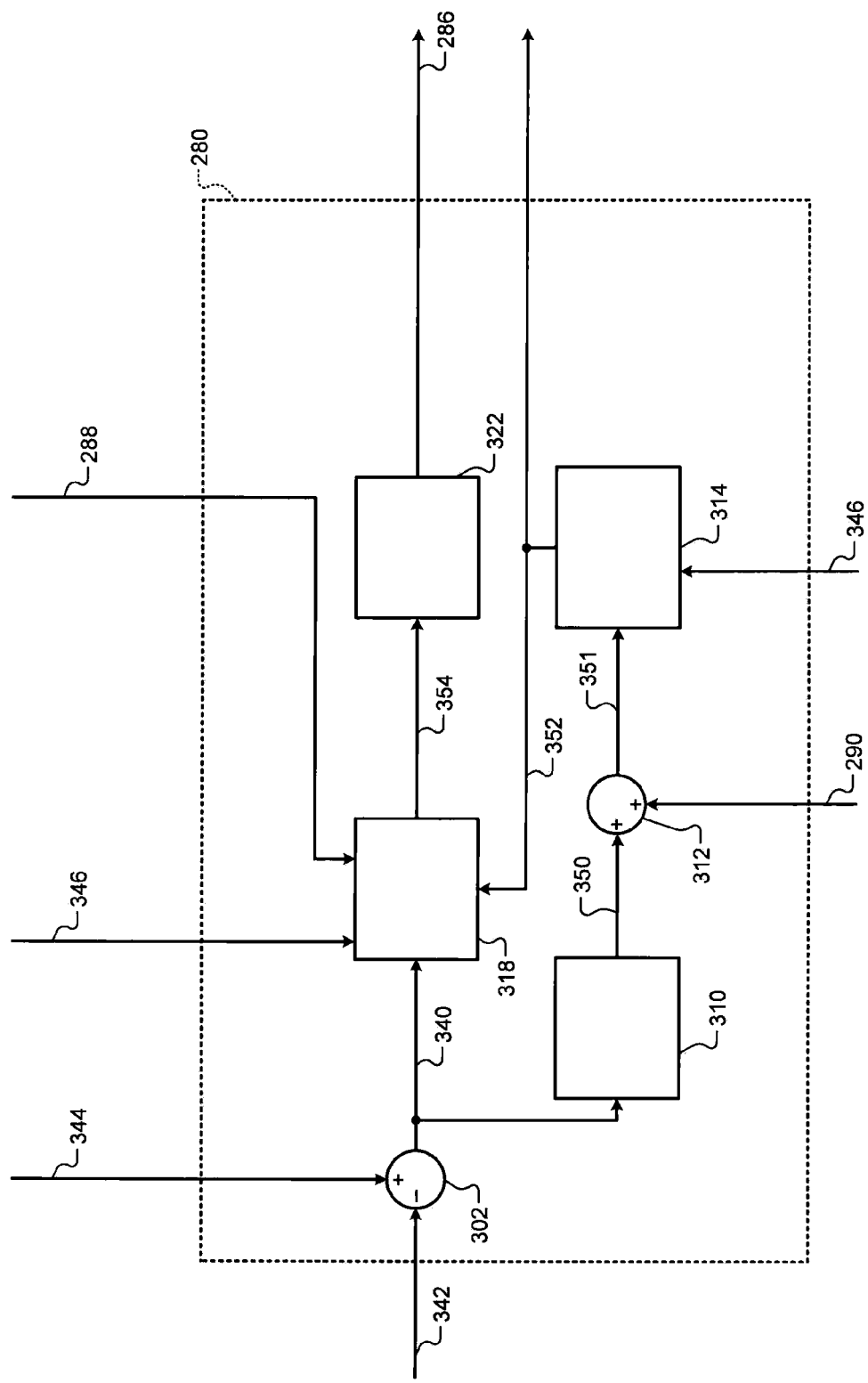
FIG. 3 is a functional block diagram of an exemplary implementation of a maximum torque determination module according to the principles of the present disclosure.
Figure 4:
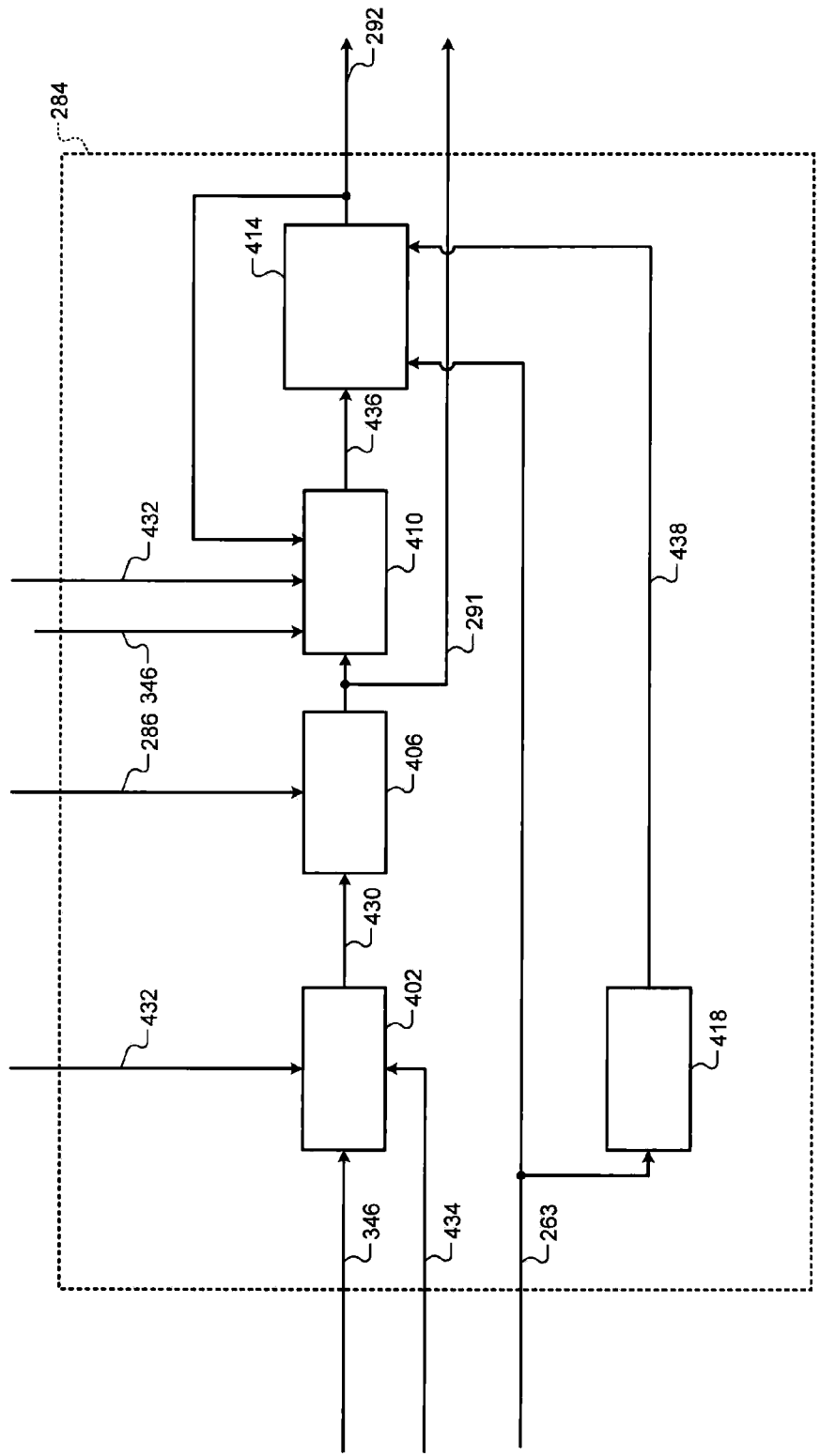
FIG. 4 is a functional block diagram of an exemplary fuel economy (FE) mode control module according to the principles of the present disclosure.

The exemplary implementation of the ECM 114 also includes a max torque determination module 280 (see also FIG. 3), a correction module 282 (see also FIG. 6), and a fuel economy (FE) mode control module 284 (see also FIG. 4).

The max torque determination module 280 determines a maximum brake torque for operation in a FE mode (Max FE Brake Torque) 286. The maximum FE brake torque 286 corresponds to a maximum engine output (flywheel) torque for operating in the FE mode. When operating in the FE mode, the torque production capability of the engine 102 is limited, but FE of the vehicle is increased.

For example only, the FE mode may be an active fuel management (AFM) mode in a vehicle that is capable of performing selective cylinder deactivation or a low-lift mode in a vehicle that is capable of performing variable valve lift (VVL). Operating in the AFM mode may include deactivating a predetermined number (e.g., half) of the cylinders of the engine 102. Operating in the low-lift mode may include opening at least one of the intake and the exhaust valves 122 and 130 for a lesser period of time (referred to as duration) and/or to a lesser extent (referred to as lift).

The max torque determination module 280 determines the maximum FE brake torque 286 using a relationship 287 between MAP and torque. The MAP to torque relationship 287 may be modeled by an equation and/or may be stored as a lookup table. For example, the MAP to torque relationship 287 may be $$T = f(MAP, S, I, E, AF, OT, \#, RPM), \tag{3}$$

where torque (T) is the maximum FE brake torque 286 and is a function of manifold absolute pressure (MAP), spark timing (S), intake cam phaser position (I), exhaust cam phaser position (E), air/fuel ratio (AF), oil temperature (OT), number of activated cylinders (#), and engine speed (RPM). Additional variables may also be accounted for, such as the degree of opening of an exhaust gas recirculation (EGR) valve.

The max torque determination module 280 determines a desired maximum MAP for operation in the FE mode (Desired Max FE MAP). The MAP used in the MAP to torque relationship 287 may be the desired maximum FE MAP. However, the torques determined using the APC to torque relationship 273 and the MAP to torque relationship 287, respectively, may be different under some circumstances. The max torque determination module 280 selectively adjusts the maximum FE brake torque 286 based on a MAP to torque correction 288 that may be provided by the correction module 282. The max torque determination module 280 may correct the MAP to torque relationship 287 based on the MAP to torque correction 288 so that a brake torque determined based on the MAP will be the same as a brake torque determined based on the APC using the APC to torque relationship 273.

The desired maximum FE MAP is a MAP that corresponds to a desired minimum vacuum for operation in the FE mode (Desired Min FE Vacuum). The max torque determination module 280 converts the desired maximum FE MAP into a desired maximum APC for operation in the FE mode (Desired Max FE APC) using a MAP to APC relationship 289.

However, an APC determined by converting a MAP into the APC using the MAP to APC relationship 289 may be different than an actual APC while operating at the desired maximum FE MAP. Accordingly, the max torque determination module 280 selectively adjusts the desired maximum FE APC based on a MAP to APC correction 290 that may be provided by the correction module 282.

The FE mode control module 284 determines a maximum noise, vibration, and harshness (NVH) torque for operation in the FE mode (Max NVH Torque). The maximum NVH torque corresponds to a maximum engine output torque during operation in the FE mode above which more than a predetermined NVH level may be experienced within a passenger cabin of the vehicle.

The FE mode control module 284 sets a maximum torque for the FE mode (Max FE Torque) 291 equal to a lesser one of the maximum FE brake torque 286 and the maximum NVH torque. The FE mode control module 284 selectively triggers entry into the FE mode (when not operating in the FE mode) and selectively triggers exit out of the FE mode (when operating in the FE mode) based on the maximum FE torque 291. The FE mode control module 284 generates an FE mode signal 292 that indicates whether to operate the engine 102 in the FE mode.

The FE mode control module 284 provides the maximum FE torque 291 and the FE mode signal 292 to the air control module 228. The air control module 228 limits the air torque request 265 to the maximum FE torque 291 when the FE mode signal 292 indicates that the engine 102 should be controlled in the FE mode. The air control module 228 determines the desired MAP 266, the desired throttle area 267, and the desired APC 268 based on the air torque request 265.

Referring now to FIG. 3, a functional block diagram of an exemplary implementation of the max torque determination module 280 is presented. The exemplary implementation of the max torque determination module 280 includes a desired maximum FE MAP module 302, a MAP to APC module 310, and a MAP correction module 312. The exemplary implementation of the max torque determination module 280 also includes an optimum spark determination module 314, a MAP to torque module 318 and a brake torque module 322.

The desired maximum FE MAP module 302 determines a desired maximum MAP for operating in the FE mode (Desired Max FE MAP) 340 based on a desired minimum FE vacuum 342 and a pre-throttle pressure 344. More specifically, the desired maximum FE MAP module 302 sets the desired maximum FE MAP 340 equal to the pre-throttle pressure 344 less the desired minimum FE vacuum 342.

The pre-throttle pressure 344 may be measured using a pre-throttle pressure sensor (not shown) or determined based on one or more other pressures, such as the MAP measured by the MAP sensor 184 before engine startup. The desired minimum FE vacuum 342 corresponds to a minimum vacuum within the intake manifold 110 during operation in the FE mode. The desired minimum FE vacuum 342 may be determined based on the RPM 346 measured by the RPM sensor 180 in various implementations.

Additionally or alternatively, the desired minimum FE vacuum 342 may be a calibrated value that optimizes one or more characteristics. The characteristics may include, for example, minimizing reversion, preventing the MAP measured by the MAP sensor 184 from reaching ambient air pressure, keeping the throttle valve 112 closed to an extent, and maintaining stable control of the throttle valve 112.

Reversion refers to instances when air flows out of the intake manifold 110 toward the MAF sensor 186. The outflow of air may cause the MAF sensor 186 to incorrectly measure the MAF into the engine 102. The MAP measured by the MAP sensor 184 may be inaccurate to a certain extent when the MAP is within a predetermined amount (e.g., 4 kilopascal) of ambient pressure. Preventing the MAP from coming within the predetermined amount of the ambient pressure may ensure that the MAP remains accurate. Induction noise (e.g., from valve opening and closing) may be loudest when the throttle valve 112 is fully open. Keeping the throttle valve 112 closed to some extent decreases the amount of induction noise. Control of the throttle valve 112 may be coarse near a fully closed throttle opening and a fully open throttle opening. Preventing the throttle valve 112 from being fully closed or fully open increases stability of the control of the throttle valve 112.

The MAP to APC module 310 converts the desired maximum FE MAP 340 into a desired maximum FE APC 350 using the MAP to APC relationship 289. The desired maximum FE APC 350 corresponds to a maximum APC for operation in the FE mode.

The MAP correction module 312 determines a corrected maximum FE APC (Corrected Max FE APC) 351 based on the desired maximum FE APC 350 and the MAP to APC correction 290. More specifically, the MAP correction module 312 corrects the desired maximum FE APC 350 based on the MAP to APC correction 290 to account for a difference between an actual APC and an APC determined by converting a MAP into the APC using the MAP to APC relationship 289. The MAP correction module 312 may set the corrected maximum FE APC 351 equal to a sum of the desired maximum FE APC 350 and the MAP to APC correction 290.

The optimum spark determination module 314 determines the optimum spark timing (Optimum Spark) 352 based on the corrected maximum FE APC 351. For example only, the optimum spark determination module 314 may determine the optimum spark timing 352 based on the corrected maximum FE APC 351 and a table of optimum spark timings indexed by APC and the RPM 346.

The MAP to torque module 318 determines a maximum base amount of torque for operation in the FE mode (Max FE Base Torque) 354 based on the desired maximum FE MAP 340 and the optimum spark timing 352. The MAP to torque module 318 determines the maximum FE base torque 354 further based on the RPM 346 and the MAP to torque correction 288.

For example only, the MAP to torque module 318 may determine an uncorrected maximum FE base torque (not shown) based on the desired maximum FE MAP 340. More specifically, the MAP to torque module 318 may convert the desired maximum FE MAP 340 into the uncorrected maximum FE base torque based on the MAP to torque relationship 287, the RPM 346, the optimum spark timing 352, and the intake and exhaust camshaft phaser positions where a maximum engine output torque is produced. For example only, the MAP to torque module 318 may convert the desired maximum FE MAP 340 into the uncorrected maximum FE base torque using the relationship (3) described above.

The MAP to torque module 318 may then correct the uncorrected maximum FE base torque based on the MAP to torque correction 288 to account for a difference between a first torque determined using the MAP to torque relationship 287 and a second torque determined using the APC to torque relationship 273. For example only, the MAP to torque module 318 may set the maximum FE base torque 354 equal to a sum of the uncorrected maximum FE base torque and the MAP to torque correction 288.

A base torque refers to an engine output torque produced when the engine 102 is operated on a testing device (e.g., a dynamometer) with the engine 102 warm and without accessory loads, such as a generator and air conditioning. The brake torque module 322 converts the maximum FE base torque 354 into the maximum FE brake torque 286. A brake torque refers to a base torque less frictional losses of the engine 102. In other words, a brake torque corresponding to a base torque may be determined by subtracting the frictional losses from the base torque. In various implementations, the MAP to torque module 318 may convert the desired maximum FE MAP 340 directly into the maximum FE brake torque 286 while accounting for the MAP to torque correction 288. In various implementations, the MAP to torque module 318 may convert the desired maximum FE MAP 340 into an indicated torque (torque produced by combustion events), correct the indicated torque for the MAP to torque correction 288, and convert from the corrected indicated torque into the maximum FE brake torque 286.

Referring now to FIG. 4, a functional block diagram of an exemplary implementation of the FE mode control module 284 is presented. The exemplary implementation of the FE mode control module 284 includes an NVH torque determination module 402, a FE mode max torque module 406, a threshold(s) determination module 410, an FE mode enabling/disabling module 414, and a filtering module 418.

The NVH torque determination module 402 determines the maximum NVH torque (Max NVH Torque) 430 based on the RPM 346 measured using the RPM sensor 180, a gear ratio 432, and an ambient air temperature 434. The maximum NVH torque 430 corresponds to an engine output torque during operation in the FE mode above which more than the predetermined NVH level may be experienced within the passenger cabin of the vehicle.

The NVH torque determination module 402 may determine the maximum NVH torque 430 based on the RPM 346 because the firing period (i.e., the period between consecutive firing events in the firing order) may affect the NVH level experienced within the passenger cabin. The NVH torque determination module 402 may determine the maximum NVH torque 430 based on the gear ratio 432 because the ratio between the crankshaft speed and axle speed (e.g., wheel speed) may affect the NVH level experienced within the passenger cabin. The NVH torque determination module 402 may determine the maximum NVH torque 430 based on the ambient air temperature 434 because the ambient air temperature 434 may affect the damping ability of engine dampers (not shown). For example only, the engine dampers may stiffen as the ambient air temperature 434 decreases, and the NVH level experienced within the passenger cabin may increase as the engine dampers stiffen.

The FE mode max torque module 406 determines the maximum FE torque 291 based on the maximum NVH torque 430 and the maximum FE brake torque 286. More specifically, the FE mode max torque module 406 sets the maximum FE torque 291 equal to a lesser one of the maximum FE brake torque 286 and the maximum NVH torque 430. The FE mode max torque module 406 outputs the maximum FE torque 291 to the air control module 228. The air control module 228 limits the air torque request 265 to the maximum FE torque 291 during operation in the FE mode.

The FE mode max torque module 406 also provides the maximum FE torque 291 to the threshold(s) determination module 410. The threshold(s) determination module 410 determines one or more thresholds 436 based on the maximum FE torque 291.

For example only, the threshold(s) determination module 410 may determine two thresholds 436 for exiting (i.e., disabling) operation in the FE mode. The two thresholds 436 may be referred to as a fast exit threshold and a slow exit threshold. The threshold(s) determination module 410 may set the fast exit threshold equal to a sum of the maximum FE torque 291 and a first offset. The first offset may be calibratable based on the gear ratio 432 and the RPM 346.

The threshold(s) determination module 410 may set the slow exit threshold equal to a second sum of the maximum FE torque 291 and a second offset. The second offset may be calibratable and may also be determined based on the gear ratio 432 and the RPM 346. The second offset is less than the first offset. For example only, the first offset may be approximately 100 Newton meters (Nm) while the second offset may be approximately 20 Nm under a given set of operating conditions. The first and second offsets correspond to a maximum loss in engine output torque that is acceptable during operation in the FE mode in the interest of increased FE.

The threshold(s) determination module 410 may determine another one of the thresholds 436 for entering and operating in the FE mode. This threshold may be referred to as an entry threshold. For example only, the threshold(s) determination module 410 may set the entry threshold equal to a third sum of the maximum FE torque 291 and a third offset. The third offset may be calibratable and is less than the second offset. The amount that the third offset is less than the second offset may be calibrated to provide hysteresis. For example only, if the second offset is 0 Nm, the third offset may be set to approximately −40 Nm.

Figure 7:
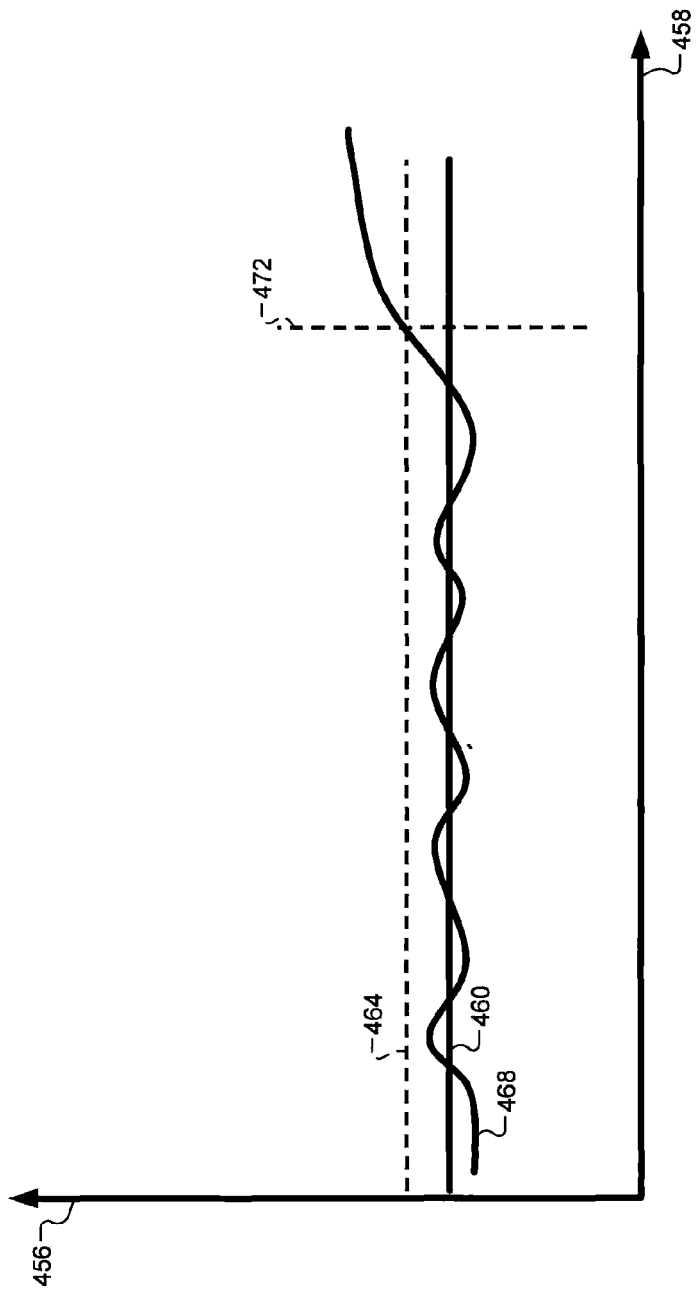
FIG. 7 is an exemplary graph of torque versus time according to the principles of the present disclosure.

Referring now to FIG. 7, an exemplary graph of torque 456 versus time 458 is presented. With continuing reference to FIG. 4, exemplary trace 460 tracks the maximum FE torque 291 under steady-state operating conditions. Exemplary trace 464 tracks, for example, the slow exit threshold or the fast exit threshold determined based on the maximum FE torque 291 under the steady-state operating conditions. Exemplary trace 468 may track, for example, the driver torque request 254.

Referring again to FIG. 4, the FE mode enabling/disabling module 414 generates the FE mode signal 292 to enable and disable operation in the FE mode. For example only, the FE mode enabling/disabling module 414 may set the FE mode signal 292 to an active state (e.g., 5 Volts) to trigger operation in the FE mode. The FE mode enabling/disabling module 414 may set the FE mode signal 292 to an inactive state (e.g., 0 Volts) to trigger operation in a mode other than the FE mode.

The FE mode enabling/disabling module 414 generates the FE mode signal 292 based on the state of the FE mode signal 292 and one or more of the thresholds 436. When the FE mode signal 292 is in the inactive state (i.e., when the FE mode is disabled), the FE mode enabling/disabling module 414 selectively transitions the FE mode signal 292 to the active state based on a comparison of the adjusted predicted torque request 263 with the entry threshold. For example only, the FE mode enabling/disabling module 414 transitions the FE mode signal 292 to the active state when the adjusted predicted torque request 263 is less than the entry threshold. The FE mode enabling/disabling module 414 may additionally require that the adjusted predicted torque request 263 be less than the entry threshold for a predetermined period before transitioning the FE mode signal 292 to the active state.

When the FE mode signal 292 is in the active state (i.e., during operation in the FE mode), the FE mode enabling/disabling module 414 selectively transitions the FE mode signal 292 to the inactive state based on the fast and slow exit thresholds. For example only, the FE mode enabling/disabling module 414 may transition the FE mode signal 292 to the inactive state when the adjusted predicted torque request 263 is greater than the fast exit threshold. The FE mode enabling/disabling module 414 may also transition the FE mode signal 292 to the inactive state when a filtered version of the adjusted predicted torque request 263 is greater than the slow exit threshold. The filtered version of the adjusted predicted torque request 263 may be called a filtered adjusted predicted torque request 438. In the example of FIG. 7, the FE mode enabling/disabling module 414 transitions the FE mode signal 292 to the inactive state at approximately time 472.

The filtering module 418 filters the adjusted predicted torque request 263 and produces the filtered adjusted predicted torque request 438. The filtering module 418 may filter the adjusted predicted torque request 263, for example, using a first-order lag filter. A filtering coefficient used in filtering the adjusted predicted torque request 263 may be variable.

The filtering module 418 may adjust the filtering coefficient based on whether the adjusted predicted torque request 263 is increasing or decreasing. More specifically, the filtering module 418 may decrease the filtering coefficient when the adjusted predicted torque request 263 is increasing, and increase the filtering coefficient when the adjusted predicted torque request 263 is decreasing. The increasing and decreasing of the filtering coefficient when the adjusted predicted torque request 263 is decreasing and increasing, respectively, may bias the FE mode enabling/disabling module 414 toward operating in the FE mode for as long as possible before disabling operation in the FE mode.

Figure 5:
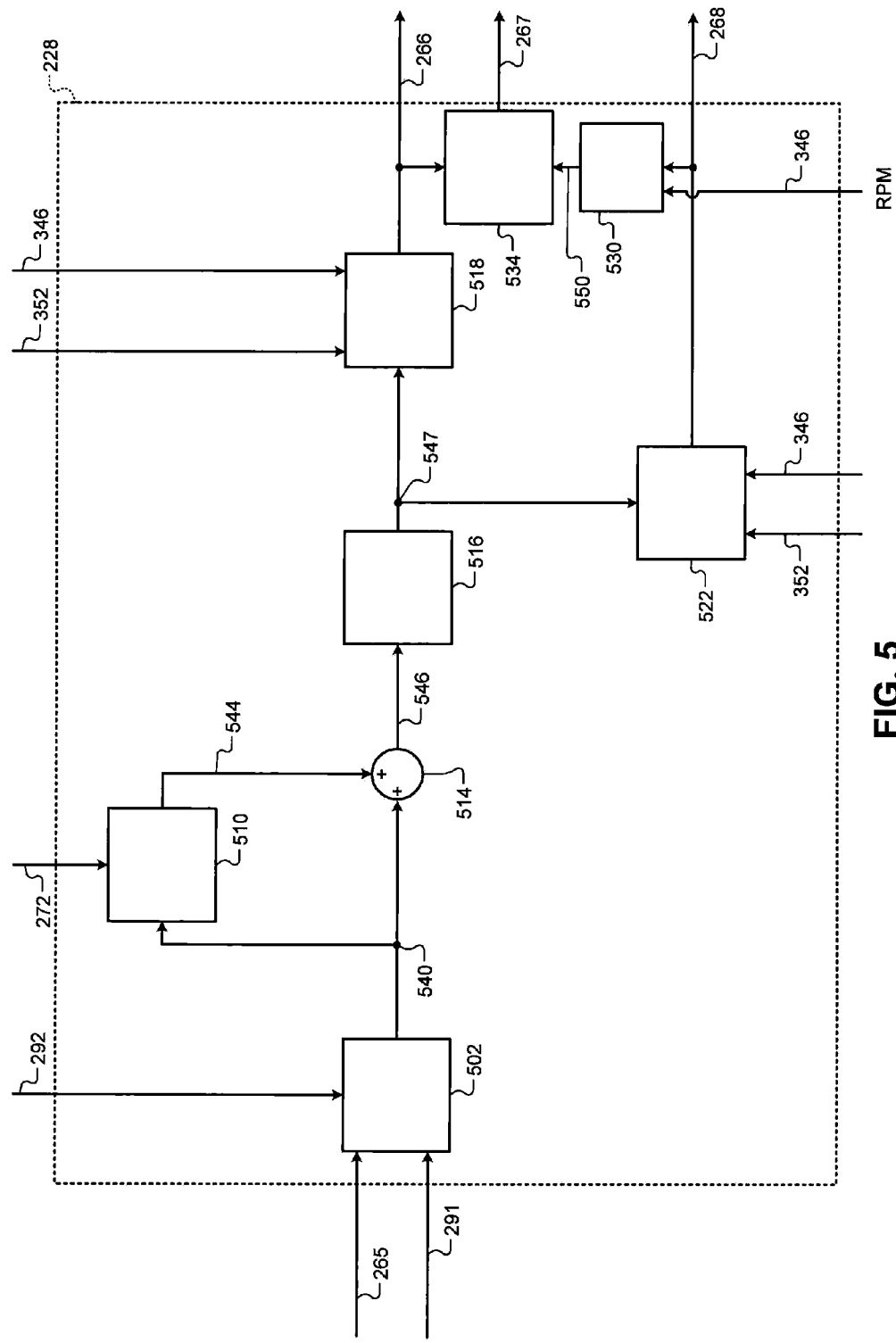
FIG. 5 is a functional block diagram of an exemplary air control module according to the principles of the present disclosure.

Referring now to FIG. 5, a functional block diagram of an exemplary implementation of the air control module 228 is presented. The exemplary implementation of the air control module 228 includes a limiting module 502, a closed-loop module 510, a correction module 514, and a base torque module 516. The exemplary implementation of the air control module 228 also includes a desired MAP module 518, a desired APC module 522, a desired airflow module 530, and a desired area module 534.

The limiting module 502 receives the air torque request 265 and the maximum FE torque 291. The limiting module 502 limits the air torque request 265 to the maximum FE torque 291 when the FE mode signal 292 is in the active state. The limiting module 502 outputs the selectively limited version of the air torque request 265, referred to as an initial air torque request 540.

The closed-loop module 510 receives the initial air torque request 540 and the achieved air torque 272. The closed-loop module 510 determines a closed-loop torque correction 544 based on a difference between the initial air torque request 540 and the achieved air torque 272.

The correction module 514 determines a corrected air torque request 546 based on the initial air torque request 540 and the closed-loop torque correction 544. More specifically, the correction module 514 may set the corrected air torque request 546 equal to a sum of the initial air torque request 540 and the closed-loop torque correction 544.

The base torque module 516 converts the corrected air torque request 546 into a base air torque request 547. The base torque module 516 may convert the corrected air torque request 546 into the base air torque request 547, for example, by adding the frictional losses of the engine 102 to the corrected air torque request 546.

The desired MAP module 518 determines the desired MAP 266 based on the base air torque request 547 and an inverse of the MAP to torque relationship 287. The desired MAP module 518 determines the desired MAP 266 further based on the optimum spark timing 352 and the RPM 346. For example only, the desired MAP module 518 may determine the desired MAP 266 using the relationship:

$$MAP_{des} = T^{-1}(T_{des}, I, E, AF, OT, \#, RPM, S), \quad (4)$$

where $MAP_{des}$ is the desired MAP 266, $T^{-1}$ denotes use of an inverse of the MAP to torque relationship 287, $T_{des}$ is the base air torque request 547, S is the optimum spark timing 352, RPM is the RPM 346, I and E are the intake cam phaser positions, respectively, AF is the air/fuel ratio, OT is the oil temperature, and # is the number of activated cylinders. Additional variables may also be accounted for, such as the degree of opening of an exhaust gas recirculation (EGR) valve. This relationship may be embodied as an equation and/or as a lookup table. The air/fuel ratio (AF) may be the actual air/fuel ratio, as reported by the fuel control module 240.

The desired APC module 522 determines the desired APC 268 based on the base air torque request 547 and an inverse of the APC to torque relationship 273. The desired APC module 522 determines the desired APC 268 further based on the optimum spark timing 352 and the RPM 346. For example only, the desired APC module 522 may determine the desired APC 268 using the relationship:

$$APC_{des} = T^{-1}(T_{des}, I, E, AF, OT, \#, RPM, S) \quad (5)$$

where $APC_{des}$ is the desired APC 268, $T^{-1}$ denotes use of an inverse of the APC to torque relationship 273, $T_{des}$ is the base air torque request 547, S is the optimum spark timing 352, RPM is the RPM 346, I and E are the intake cam phaser positions, respectively, AF is the air/fuel ratio, OT is the oil temperature, and # is the number of activated cylinders. Additional variables may also be accounted for, such as the degree of opening of an exhaust gas recirculation (EGR) valve. This relationship may be embodied as an equation and/or as a lookup table. The air/fuel ratio (AF) may be the actual air/fuel ratio, as reported by the fuel control module 240.

The desired airflow module 530 determines a desired airflow 550 based on the desired APC 268 and the RPM 346. More specifically, the desired airflow module 530 determines the desired airflow 550 based on the desired APC 268 and the firing period. For example only, the desired airflow module 530 may set the desired airflow 550 equal to the quotient of the desired APC 268 divided by the firing period. The desired area module 534 determines the desired throttle area 267 based on the desired airflow and the desired MAP 266.

Figure 6:
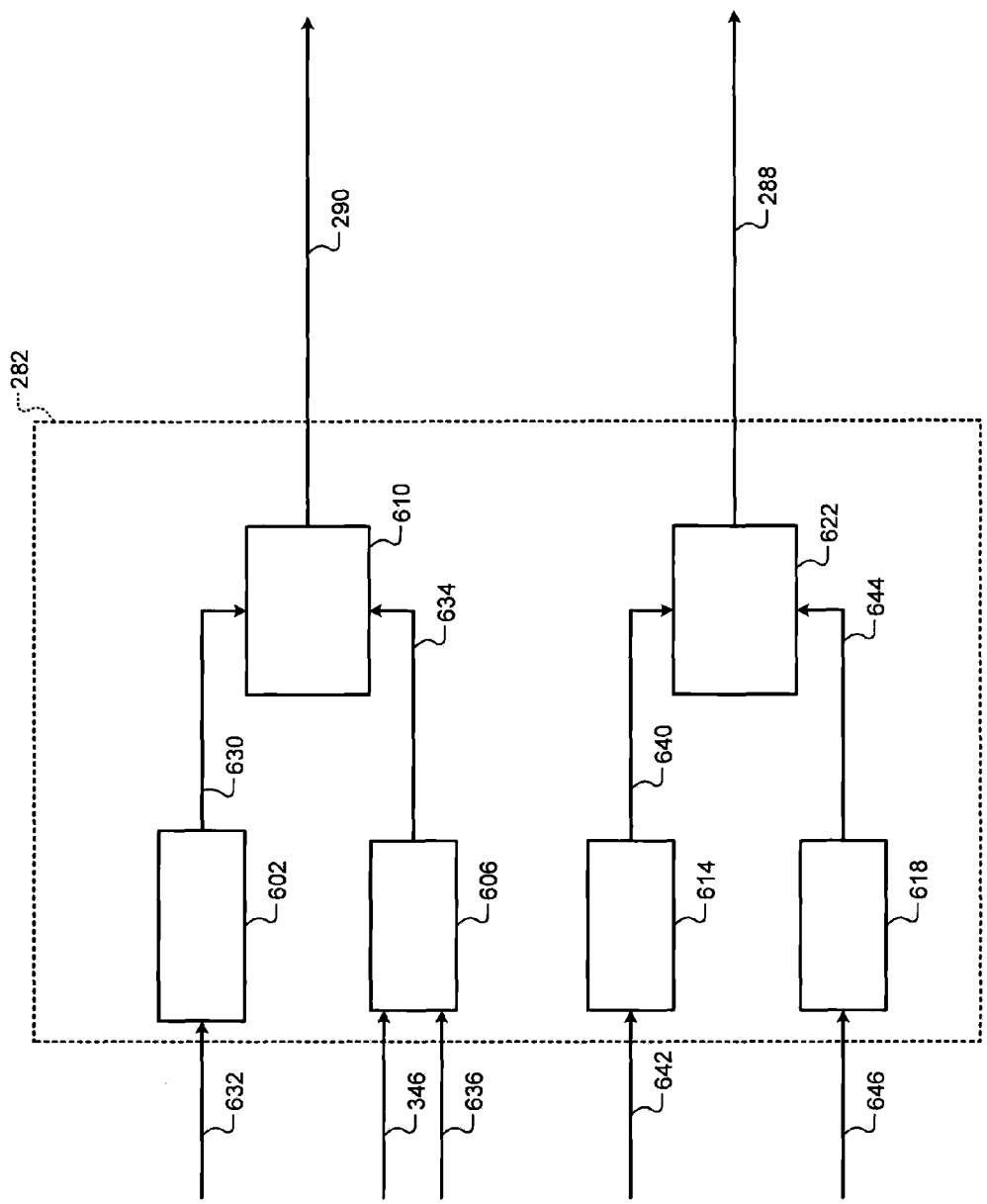
FIG. 6 is a functional block diagram of an exemplary correction module according to the principles of the present disclosure.

Referring now to FIG. 6, a functional block diagram of an exemplary implementation of the correction module 282 is presented. The exemplary implementation of the correction module 282 includes an APC estimation module 602, an actual APC module 606, and an APC correction determination module 610. The exemplary implementation of the correction module 282 also includes an APC torque determination module 614, a MAP torque determination module 618, and a MAP correction determination module 622.

The APC estimation module 602 determines an estimated APC 630 based on the MAP 632 measured by the MAP sensor 184. The APC estimation module determines the estimated APC 630 based on the MAP 632 and using the MAP to APC relationship 289.

The actual APC module 606 determines an actual APC 634 based on the RPM 346 measured using the RPM sensor 180 and the MAF 636 measured using the MAF sensor 186. For example only, the actual APC module 606 may determine the actual APC 634 based on the RPM 346 and the MAF 636 using one or more functions and/or mappings that relate the RPM 346 and the MAF 636 to the actual APC 634.

The APC correction determination module 610 receives the estimated APC 630 and the actual APC 634. The APC correction determination module 610 determines a MAP to APC correction based on a difference between the estimated and actual APCs 630 and 634. The APC correction determination module 610 may store the MAP to APC correction in a mapping of MAP to APC corrections indexed by MAP. The APC correction determination module 610 may retrieve a stored one of the MAP to APC corrections based on the desired maximum FE MAP 340 and set the MAP to APC correction 290 equal to the retrieved one of the MAP to APC corrections.

The APC torque determination module 614 determines an APC torque 640 based on an APC 642, such as the actual APC 634. For example only, the APC torque determination module 614 may determine the APC torque 640 based on the APC 642 using the APC to torque relationship 273 and the current operating parameters.

The MAP torque determination module 618 determines a MAP torque 644 based on a MAP 646, such as the MAP 632 measured by the MAP sensor 186. For example only, the MAP torque determination module 618 may determine the MAP torque 644 based on the MAP 646 using the MAP to torque relationship 287 and the current operating parameters.

The MAP correction determination module 622 receives the APC torque 640 and the MAP torque 644. The MAP correction determination module 622 determines a MAP to torque correction based on a difference between the APC and MAP torques 640 and 644. The MAP correction determination module 622 may store the MAP to torque correction in a mapping of MAP to torque corrections indexed by MAP. The MAP correction determination module 622 may retrieve a corresponding one of the stored MAP to torque corrections based on the desired maximum FE MAP 340 and set the MAP to torque correction 288 equal to the retrieved one of the MAP to torque corrections.

Figure 8:
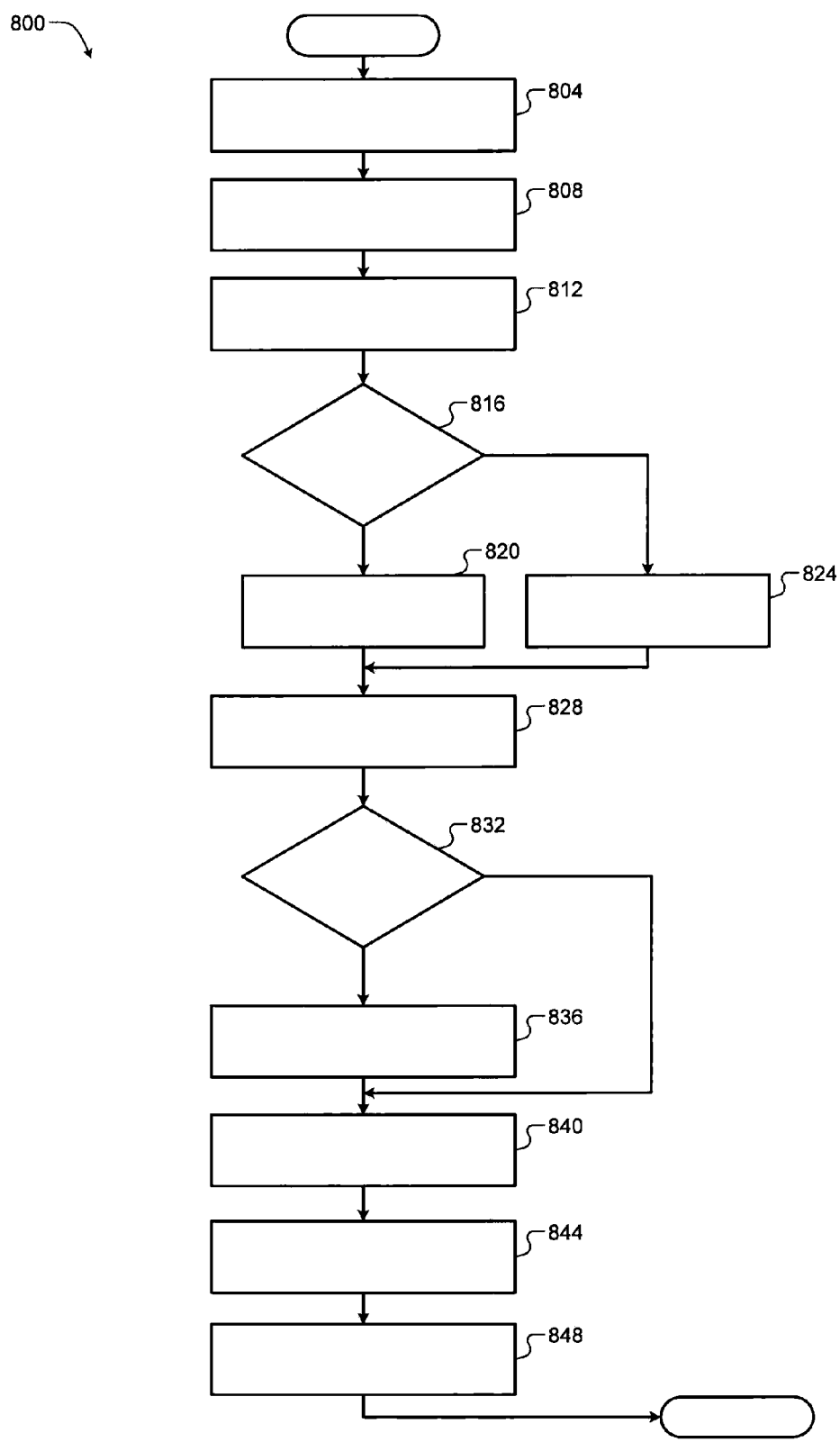
FIG. 8 is a flowchart depicting an exemplary method of determining a maximum engine output torque for operation in an FE mode according to the principles of the present disclosure.

Referring now to FIG. 8, a flowchart depicting an exemplary method 800 of determining the maximum FE torque 291 is presented. Control begins with 804 where control determines the desired minimum FE vacuum 342. Control may determine the desired minimum FE vacuum 342, for example, based on the RPM 346.

Control determines the maximum FE brake torque 286 at 808. Control determines the maximum NVH torque 430 at 812. Control may determine the maximum NVH torque 430 based on the RPM 346, the gear ratio 432, and the ambient air temperature 434. Control determines whether the maximum FE brake torque 286 is greater than the maximum NVH torque 430 at 816. If true, control sets the maximum FE torque 291 equal to the maximum FE brake torque 286 at 820 and continues with 828; if false, control sets the maximum FE torque 291 equal to the maximum NVH torque 430 at 824 and continues with 828.

At 828, control determines the thresholds. More specifically, control may determine the fast exit threshold, the slow exit threshold, and the entry threshold at 828. Control determines whether to operate in the FE mode at 832. If true, control continues with 836; if false, control continues with 840, which is discussed further below.

At 836, control limits the air torque request 265 to the maximum FE torque 291, and control continues with 840. Control determines the corrected air torque request 546 at 840. Control determines the corrected air torque request 546 based on the sum of the initial air torque request 540 and the closed-loop torque correction 544. Control determines the base air torque request 547 at 844 by converting the corrected air torque request 546 into a base torque.

Control determines the desired MAP 266, the desired APC 268, and the desired throttle area 267 at 848 and control ends. While control is shown and discussed as ending, the method 800 is illustrative of one control loop and control may instead return to 804.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
    a desired manifold absolute pressure (MAP) module that determines a desired MAP for operation of an engine in one of a cylinder deactivation mode and a low-lift mode based on a difference between a desired vacuum and an air pressure upstream of a throttle valve;
    a MAP to torque module that determines a desired torque output of the engine for operation in the one of the cylinder deactivation mode and the low-lift mode based on the desired MAP;
    a threshold determination module that determines an entry torque based on the desired torque output; and
    a fuel economy (FE) mode module that selectively triggers operation in the one of the cylinder deactivation mode and the low-lift mode based on a comparison of the entry torque and a torque request.

2. The engine control system of claim 1 further comprising:
    a noise, vibration, and harshness (NVH) torque determination module that determines an NVH torque,
    wherein an NVH value is greater than a predetermined value when an actual torque output of the engine during operation in the one of the cylinder deactivation mode and the low-lift mode is greater than the NVH torque; and
    a maximum torque module that sets a maximum torque output for operation in the one of the cylinder deactivation mode and the low-lift mode equal to one of the NVH torque and the desired torque output,
    wherein the threshold determination module determines the entry torque based on the maximum torque output.

3. The engine control system of claim 2 wherein the maximum torque module sets the maximum torque output equal to a lesser one of the NVH torque and the desired torque output.

4. The engine control system of claim 2 wherein the threshold determination module sets the entry torque further based on a gear ratio.

5. The engine control system of claim 2 wherein the NVH torque determination module determines the NVH torque based on a gear ratio, an engine speed, and an ambient air temperature.

6. The engine control system of claim 2 further comprising:
    an actuation module that determines an air torque request based on the torque request; and
    an air control module that limits to the air torque request to the maximum torque output during operation in the one of the cylinder deactivation mode and the low-lift mode to determine a limited air torque request and that determines a desired MAP, a desired air per cylinder (APC), and a desired throttle area based on the limited air torque request.

7. The engine control system of claim 2 wherein the threshold determination module further determines an exit torque based on the maximum torque output, and
    wherein the FE mode module selectively disables operation in the one of the cylinder deactivation mode and the low-lift mode based on a second comparison of the torque request and the exit torque.

8. The engine control system of claim 1 further comprising:
a correction module that determines a MAP to torque correction based on a first difference between a first torque and a second torque, that determines the first torque using a first relationship between an actual APC and the first torque, and that determines the second torque using a second relationship between a measured MAP and the second torque,
wherein the MAP to torque module determines an uncorrected desired torque output of the engine for operation in the one of the cylinder deactivation mode and the low-lift mode based on the desired MAP and determines the desired torque output based on the MAP to torque correction and the uncorrected desired torque.

9. The engine control system of claim 8 wherein the MAP to torque module sets the desired torque output to a sum of the MAP to torque correction and the uncorrected desired torque.

10. The engine control system of claim 8 further comprising:
a MAP to APC module that determines a desired air per cylinder (APC) for the engine during operation in the one of the cylinder deactivation mode and the low-lift mode based on the desired MAP;
a MAP correction module that determines a corrected APC based on the desired APC and a MAP to APC correction; and
an optimum spark timing module that determines an optimum spark timing based on the corrected APC;
wherein the correction module further determines the MAP to APC correction based on a second difference between an estimated APC and the actual APC, and
wherein the MAP to torque module determines the desired torque output further based on the optimum spark timing.

11. An engine control method comprising:
determining a desired manifold absolute pressure (MAP) for operation of an engine in one of a cylinder deactivation mode and a low-lift mode based on a difference between a desired vacuum and an air pressure upstream of a throttle valve;
determining a desired torque output of the engine for operation in the one of the cylinder deactivation mode and the low-lift mode based on the desired MAP;
determining an entry torque based on the desired torque output; and
selectively triggering operation in the one of the cylinder deactivation mode and the low-lift mode based on a comparison of the entry torque and a torque request.

12. The engine control method of claim 11 further comprising:
determining a noise, vibration, and harshness (NVH) torque,
wherein an NVH value is greater than a predetermined value when an actual torque output of the engine during operation in the one of the cylinder deactivation mode and the low-lift mode is greater than the NVH torque;
setting a maximum torque output for operation in the one of the cylinder deactivation mode and the low-lift mode equal to one of the NVH torque and the desired torque output; and
determining the entry torque based on the maximum torque output.

13. The engine control method of claim 12 further comprising setting the maximum torque output equal to a lesser one of the NVH torque and the desired torque output.

14. The engine control method of claim 12 further comprising setting the entry torque further based on a gear ratio.

15. The engine control method of claim 12 further comprising determining the NVH torque based on a gear ratio, an engine speed, and an ambient air temperature.

16. The engine control method of claim 12 further comprising:
determining an air torque request based on the torque request;
limiting to the air torque request to the maximum torque output during operation in the one of the cylinder deactivation mode and the low-lift mode to determine a limited air torque request; and
determining a desired MAP, a desired air per cylinder (APC), and a desired throttle area based on the limited air torque request.

17. The engine control method of claim 12 further comprising:
determining an exit torque based on the maximum torque output; and
selectively disabling operation in the one of the cylinder deactivation mode and the low-lift mode based on a second comparison of the torque request and the exit torque.

18. The engine control method of claim 11 further comprising:
determining a MAP to torque correction based on a first difference between a first torque and a second torque;
determining the first torque using a first relationship between an actual APC and the first torque;
determining the second torque using a second relationship between a measured MAP and the second torque;
determining an uncorrected desired torque output of the engine for operation in the one of the cylinder deactivation mode and the low-lift mode based on the desired MAP; and
determining the desired torque output based on the MAP to torque correction and the uncorrected desired torque.

19. The engine control method of claim 18 further comprising setting the desired torque output to a sum of the MAP to torque correction and the uncorrected desired torque.

20. The engine control method of claim 18 further comprising:
determining a desired air per cylinder (APC) for the engine during operation in the one of the cylinder deactivation mode and the low-lift mode based on the desired MAP;
determining a corrected APC based on the desired APC and a MAP to APC correction;
determining an optimum spark timing based on the corrected APC;
determining the MAP to APC correction based on a second difference between an estimated APC and the actual APC; and
determining the desired torque output further based on the optimum spark timing.

* * * * *